(No Model.)
I. KITSEE.
SECONDARY BATTERY.
No. 443,457. Patented Dec. 23, 1890.
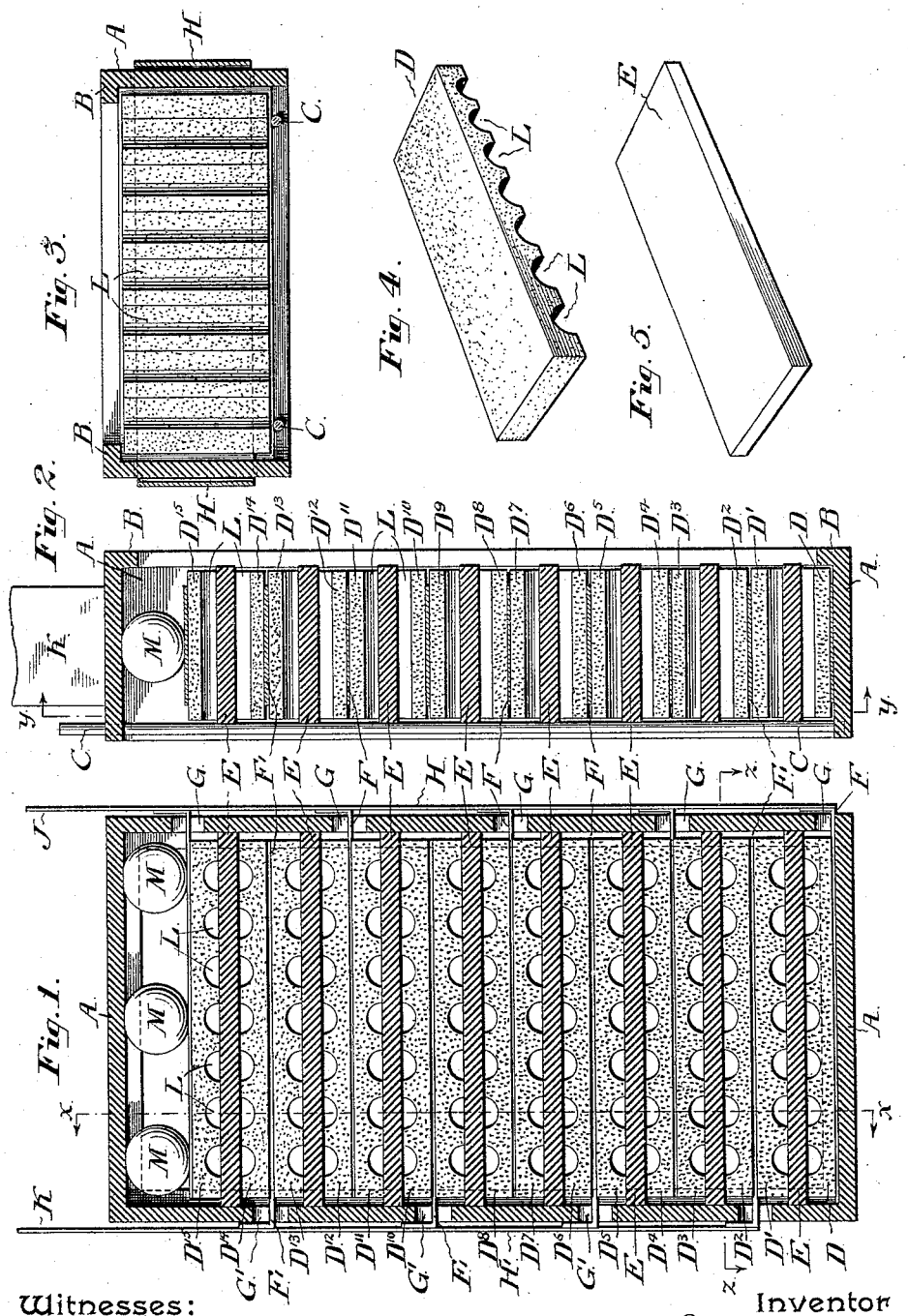
Witnesses:
F. Norman Dixon,
Lewis Altmaier.
Inventor
Isidor Kitsee
By his attorneys
W. C. Strawbridge
J. Bonsall Taylor

UNITED STATES PATENT OFFICE.

ISIDOR KITSEE, OF CINCINNATI, OHIO, ASSIGNOR TO MAYER SULZBERGER, TRUSTEE, OF PHILADELPHIA, PENNSYLVANIA.

SECONDARY BATTERY.

SPECIFICATION forming part of Letters Patent No. 443,457, dated December 23, 1890.

Application filed February 17, 1890. Serial No. 340,671. (No model.)

*To all whom it may concern:*

Be it known that I, ISIDOR KITSEE, a citizen of the United States, residing at Cincinnati, county of Hamilton, and State of Ohio, have invented certain new and useful Improvements in Secondary Batteries, of which the following is a specification.

My invention is embodied in a secondary battery in which the positive and negative electrodes respectively consist of a block or mass of active material, said blocks of active material being contained and held in a frame formed of rubber or of other non-conducting material unsusceptible to the electrolyte of the battery, each of said electrodes being connected with a conductor, said conductors forming the positive and the negative poles respectively of the battery.

One form of construction of a battery embodying my invention is shown in the drawings, in which—

Figure 1 is a longitudinal sectional elevational view upon the line $y$ $y$ of Fig. 2. Fig. 2 is a transverse sectional elevational view upon the line $x$ $x$ of Fig. 1. Fig. 3 is a horizontal sectional view upon the line $z$ $z$ of Fig. 1. Fig. 4 is a perspective view of a block of active material, and Fig. 5 a perspective view of a block or plate of non-conducting material employed to separate the active material of the positive and negative electrodes respectively.

A is a frame formed of rubber, or of other non-conducting material unsusceptible to the electrolyte of the battery, the sides of said frame, at its back, being provided with shoulders B B, and the front of said frame being provided with removable rods C C, said shoulders and rods serving to retain the blocks of active material and the non-conducting separating members in place in the frame.

In the battery shown in the drawings is embodied a number of positive electrodes and a number of negative electrodes, each of which electrodes, except the one at the top and the one at the bottom, consists of two blocks of active material placed in contact with a proper conductor. Each positive electrode is separated from its adjacent negative electrode by a plate or block of porous or other non-conducting material unsusceptible to the action of the electrolyte. One side of the containing frame of the battery is provided with holes or slots G G through which the conductors F F of the negative electrodes pass or extend. These conductors at their outer ends, are soldered, brazed or otherwise properly connected with a main conductor H the upper end J of which forms the negative pole of the battery. The other side of the containing frame is, in the same manner, provided with slots or openings G' G' through which pass or extend the conductors F' F' of the positive electrodes. These conductors, at their outer ends, are respectively soldered, brazed or otherwise connected with a main conductor H' which, at its upper end, terminates in the positive pole K of the battery. Beginning at the bottom of the battery, the negative electrode D is placed in contact with the negative conductor F, on top of this electrode is placed a non-conducting plate or block E, on top of this block, and in contact with said conductor F' is placed one of the blocks D' of a positive electrode, the other block $D^2$ of said positive electrode being placed above and in contact with the conductor F'. On top of the upper block $D^2$ of this positive electrode is placed a plate or block E of non-conducting material unsusceptible to the electrolyte of the battery; and so the construction of the battery is continued until it includes as many positive and negative elements as may be desired. The blocks of active material and the non-conducting plates or blocks are held within the frame by the shoulders B B and removable rods C C. Within the containing frame of the battery, and between its upper side and the upper element of the battery, are placed balls or buffers M M of soft rubber or of other yielding material unsusceptible to the action of the electricity or to the acid of the electrolyte. By this construction a certain amount of expansion of the active material incident to the use of the battery, is permitted.

The blocks of active material shown in the drawings are, upon one side, provided with grooves or gutters L L which cause the exposure of a greater surface of active material to the electrolyte. The blocks of active material for the positive electrodes may be made by mixing together red lead and powdered charcoal in the proportion, by volume, of fifty per cent. of each of said materials, and by mixing therewith a sufficient quantity of dilute acetic acid to properly moisten the mass to enable it to be bound together, and to, when dry, form a plate or block. About one ounce of acetic acid to fifteen ounces of water may be employed, but these proportions, as well as the proportions above named of red lead and charcoal powder, may be varied without departing from my invention.

The blocks of active material for the negative electrodes may consist of litharge and of about three per cent. by weight, of acetate of lead powder. The acetate of lead powder may be made by boiling acetate of lead in dilute sulphuric acid until it melts, and by then evaporating the mass until there is a residuum of dry acetate and sulphate of lead. This mixture of acetate and sulphate of lead is ground up and mixed with litharge in a dry condition, and it may then be placed in a proper mold to form the desired block.

I do not confine myself to the use of active material of any given composition, nor to the use of a containing frame of any given construction nor to blocks of active material, nor to non-conducting separating elements, nor to conductors, of any given form, nor to any particular combination of these devices with each other, as it is manifest that the form of these devices, as well as the particular combination thereof, shown in the drawings, may be varied, and that the positive and negative elements of the battery may be separated by the electrolyte instead of by blocks or plates of non-conducting material, all without departing from my invention.

Having thus described my invention, I claim:

1. In a secondary battery, a frame formed of rubber or other non-conducting material unsusceptible to the electrolyte of the battery and containing active material to form the positive electrode and active material to form the negative electrode, said active material forming said electrodes being provided with holes, grooves, or apertures therein, and said electrodes being each connected with a conductor to form the positive and negative poles, respectively, of the battery.

2. In a secondary battery, a frame formed of rubber or of other non-conducting material unsusceptible to the electrolyte of the battery and containing active material to form an electrode, said active material being provided with grooves, gutters, or corrugations, substantially as set forth.

In testimony that I claim the foregoing as my invention I have hereunto signed my name this 14th day of February, A. D. 1890.

ISIDOR KITSEE.

In presence of—
  WM. C. STRAWBRIDGE,
  F. NORMAN DIXON.